US008280125B2

(12) United States Patent
Slabaugh et al.

(10) Patent No.: US 8,280,125 B2
(45) Date of Patent: *Oct. 2, 2012

(54) METHOD AND SYSTEM FOR SEGMENTATION OF TUBULAR STRUCTURES USING PEARL STRINGS

(75) Inventors: Gregory G. Slabaugh, Princeton, NJ (US); Gozde Unal, Plainsboro, NJ (US); Tong Fang, Morganville, NJ (US); Brian Whited, Memphis, TN (US); Jarek Rossignac, Atlanta, GA (US)

(73) Assignee: Siemens Aktiengesellschaft, Munich (DE)

( * ) Notice: Subject to any disclaimer, the term of this patent is extended or adjusted under 35 U.S.C. 154(b) by 1210 days.

This patent is subject to a terminal disclaimer.

(21) Appl. No.: 12/012,385

(22) Filed: Feb. 1, 2008

(65) Prior Publication Data

US 2008/0187197 A1   Aug. 7, 2008

Related U.S. Application Data

(60) Provisional application No. 60/887,888, filed on Feb. 2, 2007.

(51) Int. Cl.
*G06K 9/00* (2006.01)
(52) U.S. Cl. ........ 382/128; 382/130; 382/131; 382/132; 382/173; 128/922
(58) Field of Classification Search .................. 382/100, 382/128, 131, 132, 164, 171, 172, 173; 358/453
See application file for complete search history.

(56) References Cited

U.S. PATENT DOCUMENTS

| | | | |
|---|---|---|---|
| 6,754,376 B1 | 6/2004 | Turek et al. | |
| 7,116,810 B2 | 10/2006 | Miller et al. | |
| 2002/0168110 A1* | 11/2002 | Al-Kofahi et al. | ............ 382/199 |
| 2004/0114800 A1* | 6/2004 | Ponomarev et al. | ........... 382/173 |
| 2005/0110791 A1 | 5/2005 | Krishnamoorthy et al. | |
| 2006/0159326 A1 | 7/2006 | Rasche et al. | |
| 2006/0251304 A1 | 11/2006 | Florin et al. | |
| 2007/0216678 A1 | 9/2007 | Rouet et al. | |
| 2009/0129671 A1* | 5/2009 | Hu et al. | ........................ 382/173 |

FOREIGN PATENT DOCUMENTS
WO   WO 2004104939 A1 * 12/2004

OTHER PUBLICATIONS

C. Kirbas, et al., "A Review of Vessel Extraction Techniques and Algorithms", ACM Computing Surveys, 36(2), 2004, pp. 81-121.
J. A. Tyrrell, et al., "Modeling of Vasculature Imagery Using Superellipsoids", IEEE Transactions of Medical Imaging, 26(2), 2007, pp. 223-237.
P. Medek, et al., "Computation of Tunnels in Protein Molecules Using Delaunay Triangulation", Journal of WSCG, 2007.

* cited by examiner

*Primary Examiner* — Ali Bayat (57) ABSTRACT

A method and system for segmenting tubular or stroke-like structures in 2D images is disclosed. Examples of such structures include, but are not limited to, blood vessels, bones, roads, rivers, electrical wirings, and brush-strokes. User inputs identifying a first region on the image inside of a tubular structure and a second region of the image outside of the tubular structure are received. Based on this information, an ordered series of pearls are generated along the tubular structure. Pearls are 2D disks, each having a center location and a radius determined based on local pixel intensities in the image. A continuous model of the tubular structure is generated by interpolating the center locations and radii of the ordered series of pearls.

22 Claims, 7 Drawing Sheets

METHOD AND SYSTEM FOR SEGMENTATION OF TUBULAR STRUCTURES USING PEARL STRINGS

This application claims the benefit of U.S. Provisional Application No. 60/887,888, filed Feb. 2, 2007, the disclosure of which is herein incorporated by reference.

BACKGROUND OF THE INVENTION

The present invention relates to image segmentation, and more particularly, to segmentation of tubular structures in images.

Tubular structures can appear as strokes or stroke-like structures in 2-dimensional images. As used herein, the term "stroke" refers to variable width curves in 2-dimensional images. Segmentation of stroke-like structures, such as blood vessels, is a fundamental problem in medical imaging, and is an important component of clinical applications involving diagnosis (e.g., stenosis, aneurysm, etc.), surgical planning, anatomical modeling and simulation, and treatment verification. Segmentation of stroke-like structures is a problem that also arises in other contexts including industrial applications and aerial/satellite image analysis.

Using manual segmentation techniques to segment stroke-like structures, it is possible to obtain highly accurate results. However, such manual techniques typically require too much tedious labor to be practical in clinical applications. Accordingly, various fully automatic segmentation methods have been developed for segmenting vessels and other stroke-like structures. However, due to poor contrast, noise, and clutter that is common to medical images, it is often difficult for fully automatic segmentation methods to yield robust results. Furthermore, one may be interested in extracting only a subset, for example a specific path through a branching network of stroke-like structures. Therefore, there is a salient need for an interactive segmentation method that is mostly automatic, but accepts input from an operator to guide the segmentation in a particular direction, quickly correct for errant segmentations, and add branches to an existing segmentation result. Computational efficiency is crucial to such a semi-automatic segmentation method, so that the operator will not have to wait for segmentation results while interacting with data. Typical conventional automatic segmentation techniques have runtimes that are too slow for use in such an interactive segmentation method.

BRIEF SUMMARY OF THE INVENTION

The present invention provides a method for segmenting tubular or stroke-like structures in images. Embodiments of the present invention are directed to segmenting stroke-like structures in images using pearling. Pearling is the generation an ordered series of pearls, which are variable-radius 2D disks, as a discrete representation of the stroke geometry. Pearling is robust to fluctuations in image intensities (due to noise, etc.) as the forces acting on a pearl are integrated over the region inside the pearl. Pearling is computationally efficient and well suited to user interactivity. Such interactivity can allow operator guidance of the segmentation in a particular direction, as well as operator correction of errant segmentation results.

In one embodiment of the present invention, user inputs identifying a first region on the image inside of a tubular (stroke-like) structure and a second region of the image outside of the tubular structure are received. Based on the pixel intensities in the first and second regions, probability densities for inside and outside of the structure can be estimated. An ordered series of pearls are generated along the structure. Pearls are 2D disks, each having a center location and a radius determined based on local pixel intensities in the image. The probability densities are used to iteratively estimate the center point and the radius for each pearl. A continuous model of the structure is generated by interpolating the center locations and radii of the ordered series of pearls. The center locations and the radii of the ordered series of pearls can be interpolated using an iterative subdivision interpolation, which at each step introduces a new pearl between each pair of consecutive pearls in the ordered series of pearls. The continuous model is output as a segmentation result and can be used in interactive segmentation.

These and other advantages of the invention will be apparent to those of ordinary skill in the art by reference to the following detailed description and the accompanying drawings.

DETAILED DESCRIPTION

The present invention is directed to a method for segmenting tubular or stroke-like structures in 2D images. As used herein, the term "stroke" refers to variable width curves in 2-dimensional images. The terms tubular structure, stroke structure, and stoke-like structure are used herein interchangeably. Examples of such structures include, but are not limited to, blood vessels, bones, roads, rivers, electrical wirings, and brush-strokes.

Embodiments of the present invention are described herein to give a visual understanding of the segmentation method. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, is to be understood that embodiments of the present invention may be performed within a computer system using data stored within the computer system.

Figure 1:
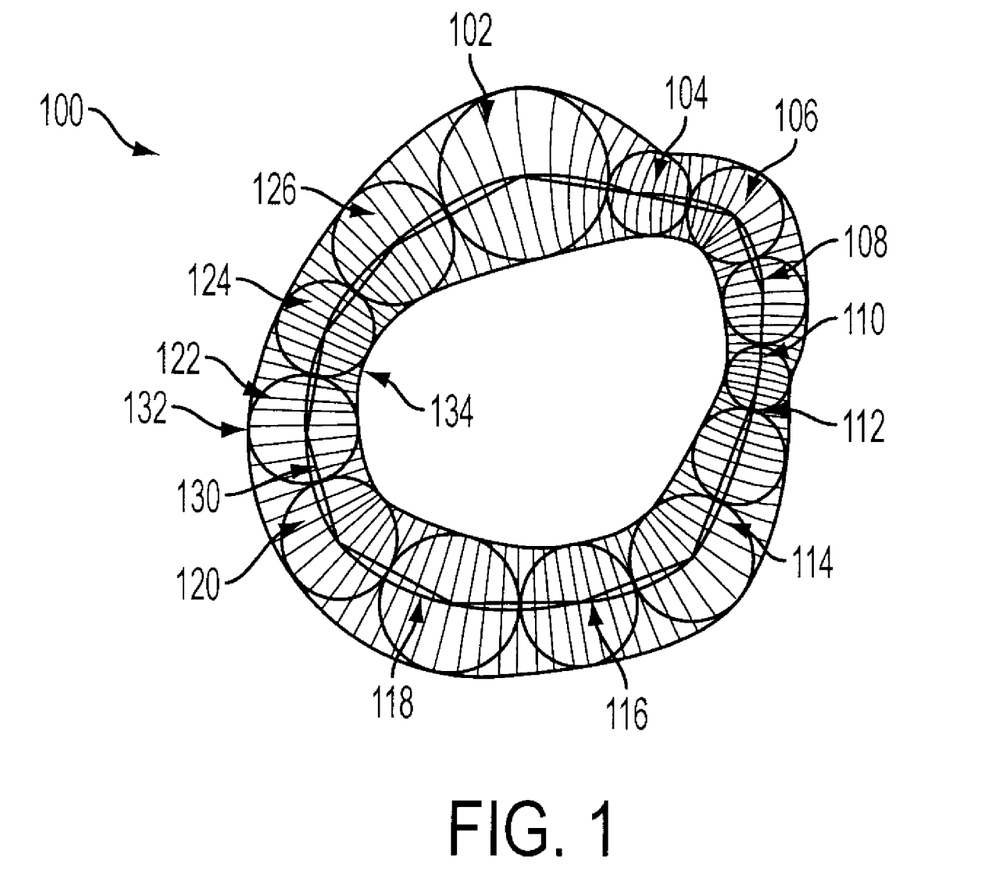
FIG. 1 illustrates an exemplary string generated using pearling.

Embodiments of the present invention are directed to segmenting strokes (or stroke-like structures) in 2D images using pearling. Pearling extracts a high level parametric representation of a stroke in a 2D image. This representation is called a string. FIG. 1 illustrates an exemplary string generated using pearling. As illustrated in FIG. 1, the string 100 comprises a ordered series of pearls 102-126, each defined by a location $c_i$ of its center, a radius $r_i$, a time value $t_i$ and possible some other attributes $a_i$. Each pearl 102-126 is a 2D disk whose location and size is determined based on the local intensity in the stroke. The continuous model of the corresponding stroke that is generated by pearling is defined as the region W swept by a pearl whose center c(t) and radius r(t) are both continuous and smooth functions of the time parameter t. These functions interpolate the centers and radii of the string of pearls 102-126 for given values $t_i$ of time. As shown in FIG. 1, curve 130 shows the interpolation of the pearl centers, and curves 132 and 134 show the interpolations of the outside and inside edges of the pearls, respectively.

Figure 2:
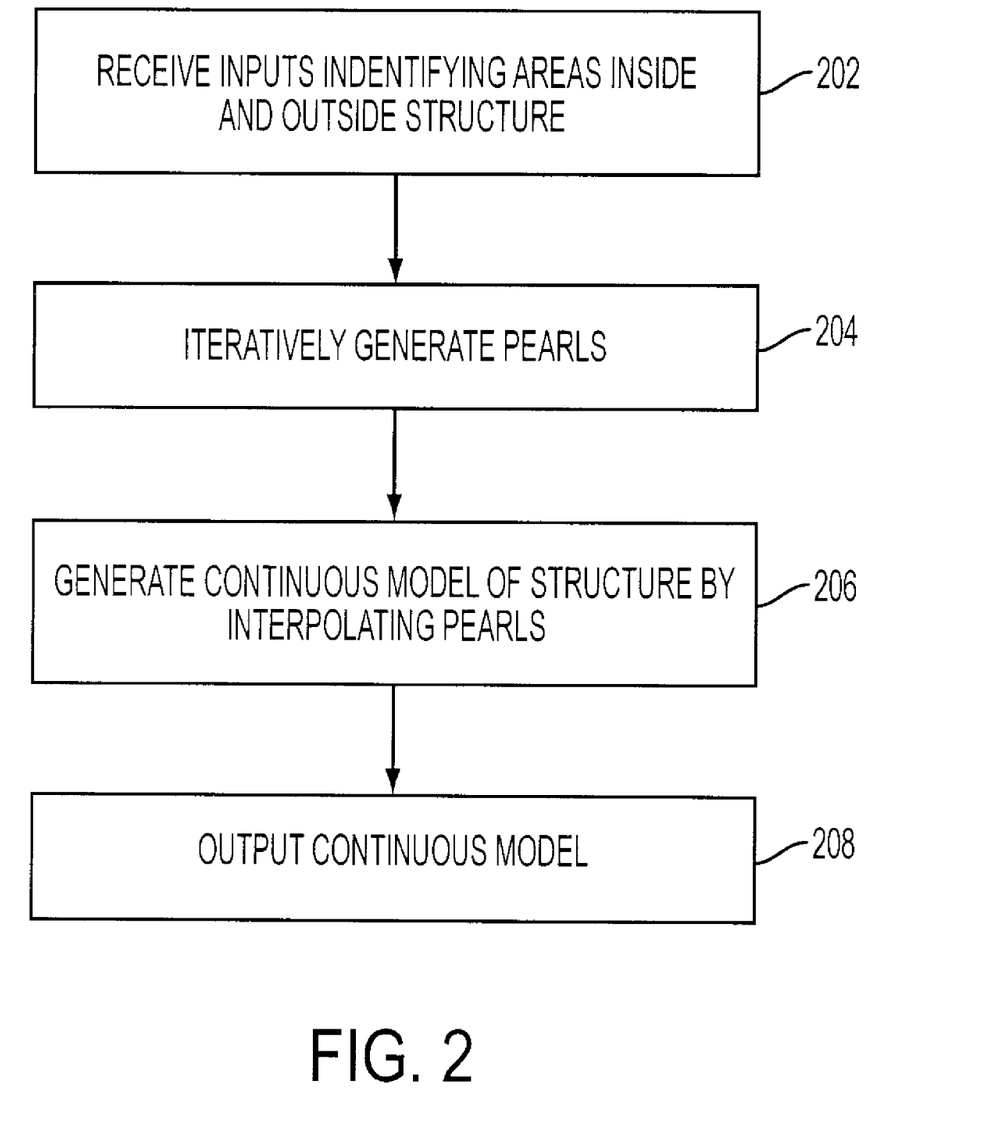
FIG. 2 illustrates a method of segmenting a tubular or stroke-like structure in a 2D image using pearling according to an embodiment of the present invention.

FIG. 2 illustrates a method of segmenting a tubular or stroke-like structure in a 2D image using pearling according to an embodiment of the present invention. At step 202, user inputs are received identifying a first region inside of the structure to be segmented and a second region outside of the structure to be segmented. The first and second regions can be identified by a user selecting an area in the 2D image inside of the stroke-like structure and the selecting another area in the 2D image outside of the stroke-like structure. Based on the first and second regions, a classification function can be estimated that classifies pixels in the image as inside or outside of the stroke-like structure. For example, the intensities inside and outside of the structure can be characterized based on the first and second regions using non-parametric density estimation. The intensities in first and second regions are histogrammed, and a probability density for each region can be estimated by applying a smoothing kernel K to the region's histogram, i.e., $$\hat{p} = \frac{1}{n}\sum_{i=1}^{n} K\left(\frac{I_i - m}{h}\right), \quad (1)$$

where $I_i$ is the intensity of the ith pixel in the region, m is the mean of intensities of the n pixels in the region, and h is the bandwidth of the estimator. A Gaussian kernel, $$K(u) = \frac{1}{\sqrt{2\pi}}e^{-\frac{1}{2}u^2},$$

can be used. Performing this operation on the user input first and second regions results in first and second probability densities, $\hat{p}_{in}(I)$ and $\hat{p}_{out}(I)$, for the first region (inside the stroke structure) and the second region (outside the stroke structure), respectively.

At step 204, pearls are iteratively generated along the stroke-like structure in the 2D image. As defined herein, a pearl is a 2D disk having a radius and a center point. The radius of each pearl can be different, and the radius and center point of each pearl is determined based on local intensities at that pearl. An initial pearl is generated based on an initial seed $c_0$. The initial seed $c_0$ can be received as a user input or can be automatically determined. The initial seed $c_0$ is a point in the stroke structure at which the initial pearl is generated. The initially seed $c_0$ can be chosen to lie close to the centerline of the stroke structure and possibly at one end of the stroke. Based on the initial seed $c_0$, an iterative method is used to generate an ordered series of pearls, one at a time. During this iterative method, at each step, the center $c_i$ and radius $r_i$ of the current pearl is calculated so as to maximize $r_i$ subject to the image data, given the constraint that the distance $d_i$ between $c_i$ and the center $c_{i-1}$ of the previous pearl is bound by functions $d_{min}(r_{i-1}, r_i)$ and $d_{max}(r_{i-1}, r_i)$. The linear functions $d_{min,max}(r_{i-1}, r_i) = ar_{i-1} + br_i$ can be used, with bounds $d_{min}(r_{i-1}, r_i) = r_i/2$ and $d_{max}(r_{i-1}, r_i) = r_{i-1} + r_i$ (i.e., the current pearl is tangent to the previous pearl). Since $d_i$ can fluctuate, it is possible to capture rapid changes in the thickness of the stroke. After several iterations, the pearl converges to a local minimum. In addition to the initial seed point, it is possible that a direction be input by a user to indicate the direction from the initial seed point in which the stroke structure runs.

Figure 3:
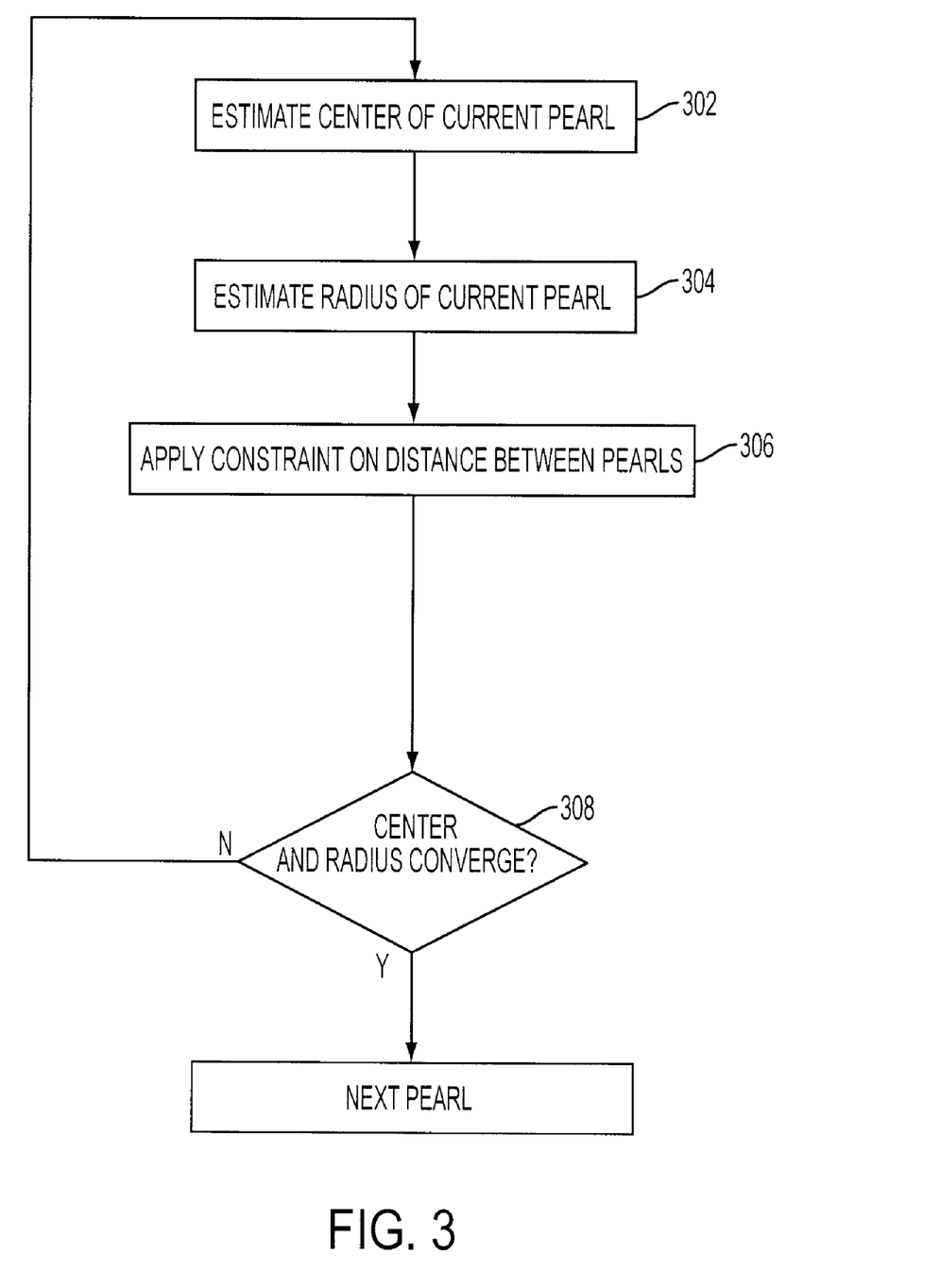
FIG. 3 illustrates an iterative method for calculating center location and radius of a current pearl according to an embodiment of the present invention.

FIG. 3 illustrates an iterative method for calculating enter $C_i$ and radius $r_i$ of a current pearl according to an embodiment of the present invention. The current pearl $P_i$ is generated based on a previous pearl $P_{i-1}$ in a stroke. As used herein, $c_{i-1}$ is the center of the previous pearl $P_{i-1}$, $c_i$ is the center of the current pearl $P_i$, and $r_i$ is the radius of the current pearl $P_i$. The objective of the method of FIG. 3 is to determine the values of $c_i$ and $r_i$ that place the ith pearl in the stroke. In order to adjust the values of $c_i$ and $r_i$ so that the current pearl fits snugly astride the stroke, two functions $f(c_i, r_i)$ and $g(c_i, r_i)$, are defined as described below.

Referring to FIG. 3, at step 302, the center $c_i$ of the current pearl is estimated using $f(c_i, r_i)$. The function $f(c_i, r_i)$ returns a gradient indicating the direction in which $c_i$ should be adjusted and the amount of the adjustment. This adjustment can then be converted to an angle relative to $c_{i-1}$ and applied to $o_i$. The function $f(c_i, r_i)$ takes the form:

$$f(c_i, r_i) = \frac{15}{2\pi r_i^2} \int_{x \in P_i} \phi(x)(c_i - x)\left(1 - \frac{\|c_i - x\|^2}{r_i^2}\right) dx \quad (2)$$

$$\phi(x) = \begin{cases} 1, & \text{if } \hat{p}_{out}(I(x)) > \hat{p}_{in}(I(x)) \\ 0, & \text{otherwise.} \end{cases} \quad (3)$$

ø(x) is a classification function that classifies a pixel l(x) as being inside the stroke or outside the stroke. The function $f(c_i, r_i)$ sums the vectors $(c_i - x)$, where x is the vector coordinate of the current pixel, across the entire area of pixels for pearl $P_i$, using only those pixels such that ø(x)=1, i.e., pixels determined to be outside the stroke structure. Each of these vectors is weighted by its distance from $c_i$, such that pixels nearer $c_i$ have a stronger influence on the result, as reflected in the $$\left(1 - \frac{\|c_i - x\|^2}{r_i^2}\right)$$

component of Equation (2). Intuitively, Equation (3) states that each point inside the ith pearl but outside the stroke imparts a force on the pearl that pushes the pearl away from the stroke boundary. When the forces are all balanced on the pearl, the pearl is typically centered in the stroke center. The $$\frac{15}{2\pi r_i^2}$$

term Equation (2) is a normalization factor calculated based on the case where a pearl is cut into two equal halves by a linear boundary separating good (inside the stroke structure) and bad (outside the stroke structure) pixels. By assuming this ideal case, the offset is calculated that is needed to move the pearl half the minimum distance that would move it entirely in the stroke structure. Determination of whether a pixel lies inside the stroke structure or outside of the stroke structure is achieved based on the first and second intensity probability densities $\hat{p}_{in}(I)$ and $\hat{p}_{out}(I)$ determined using non-parametric density estimation. A pixel having an intensity I is classified as outside of the stroke structure if $\hat{p}_{out}(I) > \hat{p}_{in}(I)$; otherwise it is classified as inside the stroke structure.

At step 304, the radius $r_i$ of the current pearl is estimated using $g(c_i, r_i)$. The function $g(c_i, r_i)$ is used to adjust $r_i$ to better fit the stroke. For robustness, pearls are designed to have a percentage p of their pixels inside the stroke structure and the rest of its pixels outside of the stroke structure. In a possible implementation, $g(c_i, r_i)$ is negative when less than p percentage of the pearl's pixels are inside the stroke structure, and positive when less than 1−p percentage of the pearl's pixels are outside of the stroke structure. The portion of the enlarged pearls that lies outside of the stroke structure can be calculated by sampling the pearl's interior. Alternatively, it is possible the pearl's boundary can be sampled. The result of $g(c_i, r_i)$ is used to scale $r_i$ to better fit the stroke structure. Accordingly, when the less than p percentage of the pearl's pixels are inside the stroke structure, $r_i$ is reduced, and when less than 1−p percentage of the pearl's pixels are outside of the stroke structure, $r_i$ is increased. $g(c_i, r_i)$ can be expressed as:

$$g(c_i, r_i) = p - \frac{\int_{x \in P_i}(1 - \phi(x))dx}{\int_{x \in P_i} dx}. \quad (4)$$

At step 306, a constraint is applied on the distance between the current pearl and the previous pearl. The distance $d_i$ between $c_i$ and the center $c_{i-1}$ of the previous pearl is constrained by the functions $d_{min}(r_{i-1}, r_i)$ and $d_{max}(r_{i-1}, r_i)$. The linear functions $d_{min,max}(r_{i-1}, r_i) = ar_{i-1} + br_i$ can be used, with bounds $d_{min}(r_{i-1}, r_i) = r_i/2$ and $d_{max}(r_{i-1}, r_i) = r_{i-1} + r_i$. Using these bounds, at the maximum distance, the current pearl is tangent to the previous pearl.

At step 308, it is determined whether the center location $c_i$ and the radius $r_i$ of the current pearl have converged. The estimation of $c_i$ and $r_i$ are interleaved for the current pearl. For a given position $c_i$ and radius $r_i$, both parameters can be updated independently using the results given by $f(c_i, r_i)$ and $g(c_i, r_i)$, respectively. In both cases, the quality of the fit is measured and an adjustment is calculated and returned. It is possible the center location $c_i$ and the radius $r_i$ are determined to converge when $f(c_i, r_i)$ and $g(c_i, r_i)$ fall below a threshold value. If the center location $c_i$ and the radius $r_i$ of the current pearl have not converged, the method returns to step 302 and repeats until convergence of both $c_i$ and $r_i$. The adjustments of $c_i$ and $r_i$ at each iteration are calculated while enforcing the constraint on $d_i$. When the center location $c_i$ and the radius $r_i$ of the current pearl have converged, the values of $c_i$ and $r_i$ are saved for that pearl, and the method of FIG. 3 is performed for the next pearl.

The method of FIG. 3 is repeated to sequentially fit pearls along the stroke structure until a stop condition is met. For example, the generation of pearls for a stroke structure can stop when the radius of the next pearl falls outside of a prescribed range, a lack of remaining pixels in the image, or when other application dependent criteria is met, such as detection of a user supplied end point or a limit on a number of bifurcations is met.

In applications in which the method of FIGS. 2 and 3 can be applied, images may contain sharp turns and bifurcations where a stroke will branch into multiple strokes and may even contain loops. Once a pearl $P_i$ has converged to fit on a stroke, an analysis of the region around $P_i$ can be performed to determine where to initially position $P_{i+1}$, taking into account that there could be more than one $P_{i+1}$ or none. This analysis is performed on the pixels in a circular band around $P_i$ with an outer radius $kr_i$ where k is some constant. For example, a value of k=1.35 can be used. Each pixel x in this band is then classified using Equation (3). This results in a classification with N>0 connected components of good pixels (i.e., pixels inside the stroke structure). At minimum, there should be a connected component indentifying the path from the previous pearl, $P_{i-1}$. If N=1, then the only possible direction is backwards and the pearling stops growing the current branch because its end has been found. If N>1, then the starting position(s) for any subsequent pearl(s) can be selected using the remaining connected components of good pixels. For each connected component $C_j$, an average point is calculated which defines a direction vector $D_j$ from the pearl center $c_i$. Subsequent pearls can then be initialized to the points on the boundary of $P_i$ which intersect each $D_j$. This allows the pearling method to accommodate sharp turns and bifurcations in the stroke structure.

Figure 4:
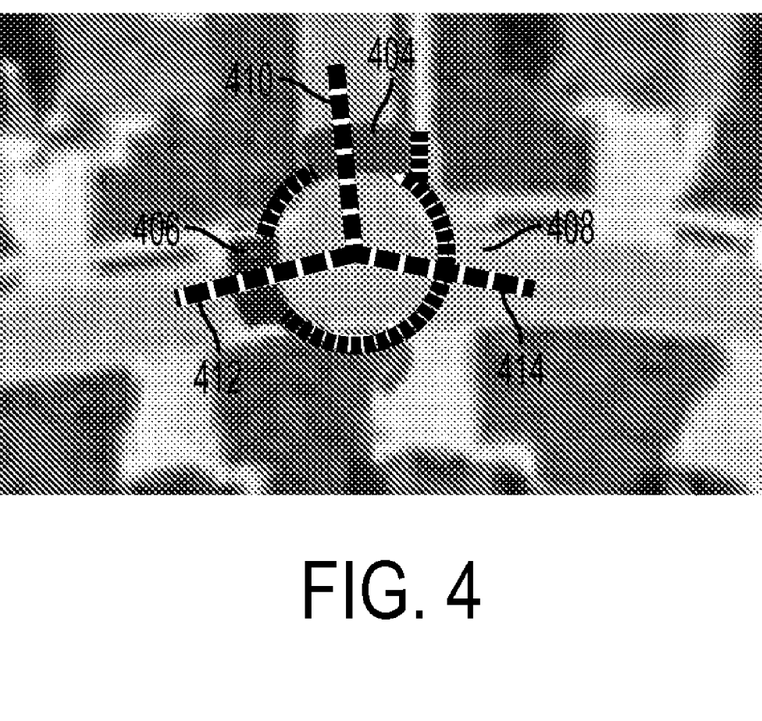
FIG. 4 illustrates an exemplary image having a stroke structure with a bifurcation.

FIG. 4 illustrates an exemplary image having a stroke structure with a bifurcation. As illustrated in FIG. 4, a pearl 402 is fit to a stroke structure at a bifurcation. The connected components 404, 406, and 408 of good pixels are determined for the pearl 402. Direction vectors 410, 412, and 414 are respectively determined for the connected components 404, 406, and 408.

A loop can also exist in the stroke structure. An intersection check between the current pearl and all previous pearls will reveal if such a loop has occurred. In this case, the current pearl is linked to the intersected pearl and its string is ended. The intersected pearl can then become a bifurcation pearl, if it already has more than one adjacent pearl, or it could be the end of another stroke still in the growing phase. If the latter is the case, and two growing strokes collide, they are both ended and become part of the same stroke.

Returning to FIG. 2, at step 206, a continuous model of the stroke structure is generated by interpolating the series of pearls. Accordingly, once all of the pearls are generated for a stroke structure, a continuous model W is generated by calculating continuous functions c(t) and r(t) that respectively interpolate the center locations and the radii of the discrete set of pearls W can be modeled as a union of an infinite set of disks, which can be expressed in parametric form W=Disk(c(t),r(t)) for t∈[0,1]. If it is assumed that the pearls are more or less uniformly spaced along the stroke structure, the string can be defined as the limit of a four-point subdivision process, which at each iteration, introduces a new pearl between each pair of consecutive pearls. This subdivision process calculates the center position and radius of each new pearl as a weighted sum of the corresponding parameters of the neighboring pearls before the subdivision. For example, a sequence of four consecutive pearls, ... $P_a$, $P_b$, $P_c$, $P_d$, ... is refined into $P_a$, $P_l$, $P_b$, $P_m$, $P_c$, $P_n$, $P_d$, ... In particular, each parameter q (e.g., x,y,r) of $P_m$ is calculated from the corresponding parameters of $P_a$, $P_b$, $P_c$, and $P_d$ using:

$$q(P_m) = \frac{-q(P_a) + 9q(P_b) + 9q(P_c) - q(P_d)}{16}. \quad (5)$$

Note that the formulation of the four-point interpolation corresponds to a local cubic fit. It is obtained by solving for the coefficient d=F(0) of a cubic function F(u)=au$^3$+bu$^2$+cu+d, given the constraints: F(−3)=q(P$_a$), F(−1)=q(P$_b$), F(1)=q(P$_c$), and F(3)=q(P$_d$). Strings for which the beginning pearl is not equal to the ending pearl are extended by two pearls so that the subdivision has enough region of support to calculate Equation (5) at the end pearls.

As described above, subdivision can be used to generate the continuous model of the series of pearls, but the present invention is not limited thereto. For example, the continuous model may be generated by fitting a piecewise polynomial model to the pearl centers and the radii of the series of pearls, or by fitting a tangent curve to consecutive pearls in the ordered series of pearls, on opposite sides of each pearl corresponding to the stroke boundary.

Since the values of $r_i$ are larger than the actual stroke structure, as described above, the values can be adjusted to better fit the stroke structure. The radii are calculated to have a percentage p of pixels inside the stroke structure and the rest outside of the stroke structure. Accordingly, all values of $r_i$ can be multiplied by p, as used in calculating $g(c_i,r_i)$, to get the true radii which can be used in the continuous model W. This reduced radius defines the core of each pearl. The area between the reduced radius and the original radius for each pearl is the crust.

Figure 5:
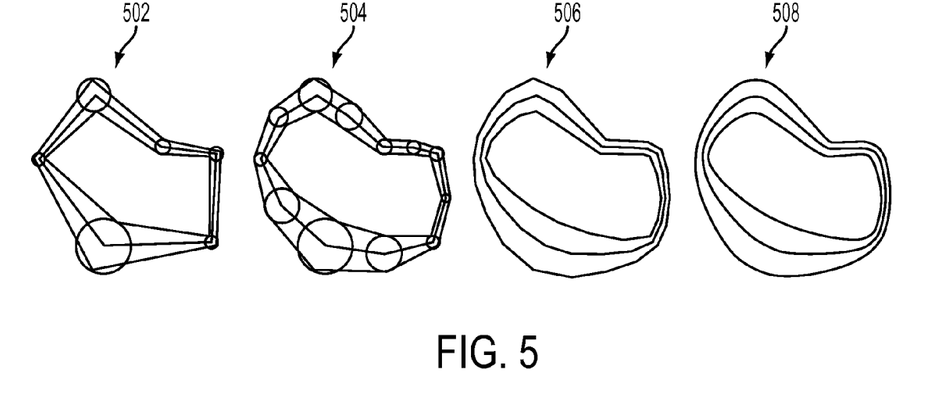
FIG. 5 illustrates interpolation of an exemplary string of pearls using subdivision.
Figure 6A:
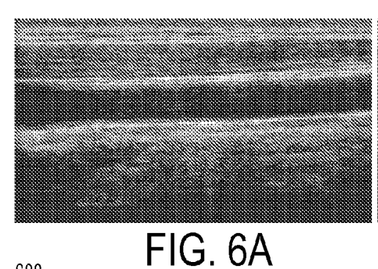
FIG. 6 illustrates exemplary segmentation results of carotid artery in an ultrasound image.
Figure 6B:
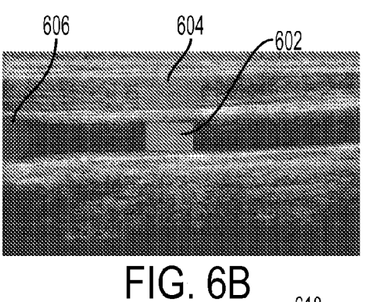
Figure 6C:
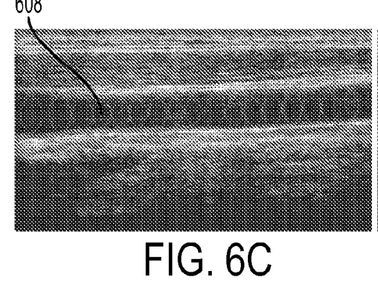
Figure 6D:
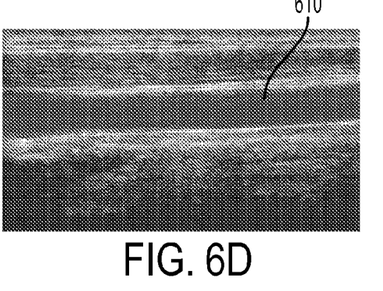

FIG. 5 illustrates interpolation of an exemplary string of pearls using subdivision. As illustrated in FIG. 5, image 502 shows an original string of six pearls generated for a stroke structure. Images 504, 506, and 508 show interpolation results for the string after 1, 2, and 5 subdivisions.

Returning to FIG. 2, at step 208, the continuous model representing the stroke structure is output as a segmentation result. The continuous model can be output by being displayed by a display of a computer system performing the segmentation method. The image of the continuous model can be printed. It is also possible that the continuous model be stored in memory or storage of a computer system. The continuous model can be output by interactive image segmentation software running on a computer system.

FIG. 6 illustrates exemplary segmentation results of carotid artery in an ultrasound image. As illustrated in FIG. 6, image (a) is the original ultrasound image. Image (b) shows inputs 602 and 604, respectively identifying a first region inside of the carotid artery and a second region outside of the carotid artery, as well as an initial point and direction 606. Image (c) shows the pearls 608 generated along the carotid artery. Image (d) shows the continuous model 610 of the carotid artery, which is the final segmentation result.

Figure 7A:
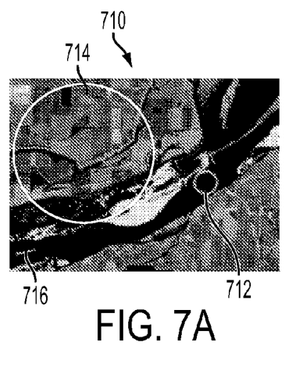
FIG. 7 illustrates exemplary segmentation results of a river in a satellite image
Figure 7B:
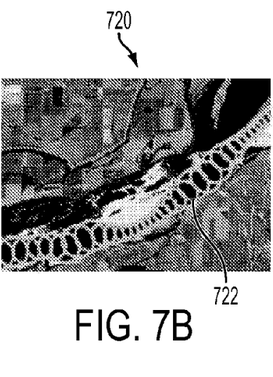
Figure 7C:
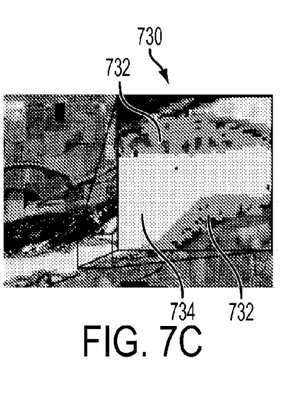

FIG. 7 illustrates exemplary segmentation results of a river in a satellite image. As illustrated in FIG. 7, image 710 is an unedited grayscale image obtained from satellite imagery of a river. Image 710 shows the inputs 712 and 714, respectively identifying a first region inside of the river and a second region outside of the river, as well as an initial point and direction 716. Image 720 shows the pearls 722 generated along the river. From the collection of discrete pearls 722 and their cores, a continuous model 732 of the crust can be extracted. Region 734 is the result of simple region growing segmentation using the same first and second regions and starting point as the pearling. Image 730 shows a zoomed in portion, which shows that almost all boundary pixels are contained within the pearling crust 732.

Figure 8A:
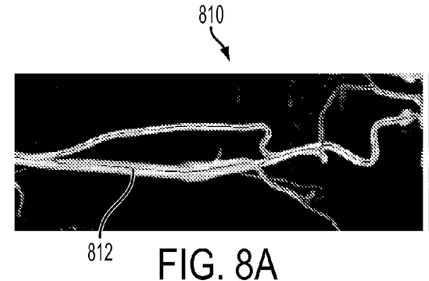
FIG. 8 illustrates exemplary segmentation results of blood vessels in an MR angiography image
Figure 8B:
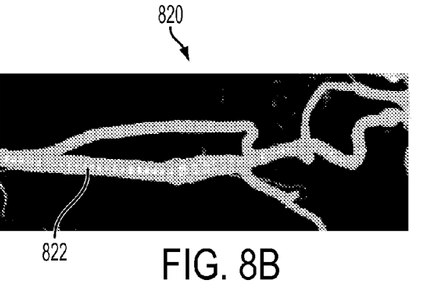

FIG. 8 illustrates exemplary segmentation results of blood vessels in an MR angiography image. As illustrated in FIG. 8, image 810 shows an MR angiography image with a continuous centerline 812 of the blood vessels generated using the above described method. Image 820 shows the MR angiography image with discrete pearls 822 generated using the above described method.

Figure 9A:
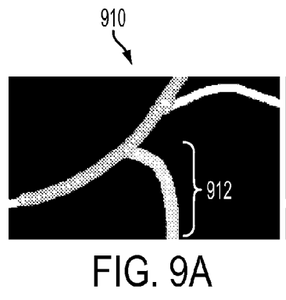
FIG. 9 illustrates exemplary user interaction with segmentation results.
Figure 9B:
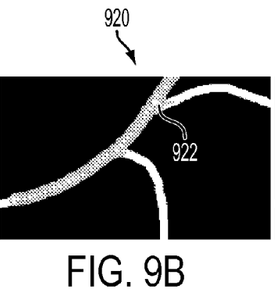
Figure 9C:
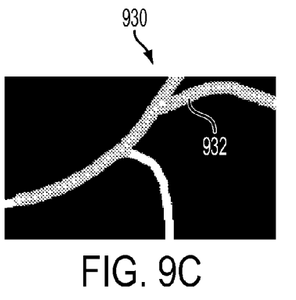

FIG. 9 illustrates exemplary user interaction with segmentation results. As illustrated in FIG. 9, image 910 shows incomplete pearling segmentation results. A user can select a string 912, for example by moving a mouse over the string 912. Once selected the string 912 can be deleted, for example with the press of a key. In image 920, the string 912 is deleted. The user can add strings to the incomplete segmentation by selecting a pearl and drawing a new direction from the selected pearl as shown at 922 of image 920. As shown in image 930, the segmentation method described above then automatically generates a new string 932 to segment the branch selected by the user.

For more control, a user may provide a rough trace of the centerline of a stoke-like structure in an image, rather than providing the initial seed point and a direction. As the user is manually tracing, pearls are generated at samples along the curve and converge in real time, thus forming the stroke as the user is tracing it with a stylus. In this mode, the user can use a stylus to quickly trace a rough curve through the desired stroke structure, and then add braches as desired. As the operator is still tracing the curves, the pearling segmentation method can calculate the idealized strokes (centerline and radius) and display them. Each new trace can then either add or remove a branch.

Figure 10:
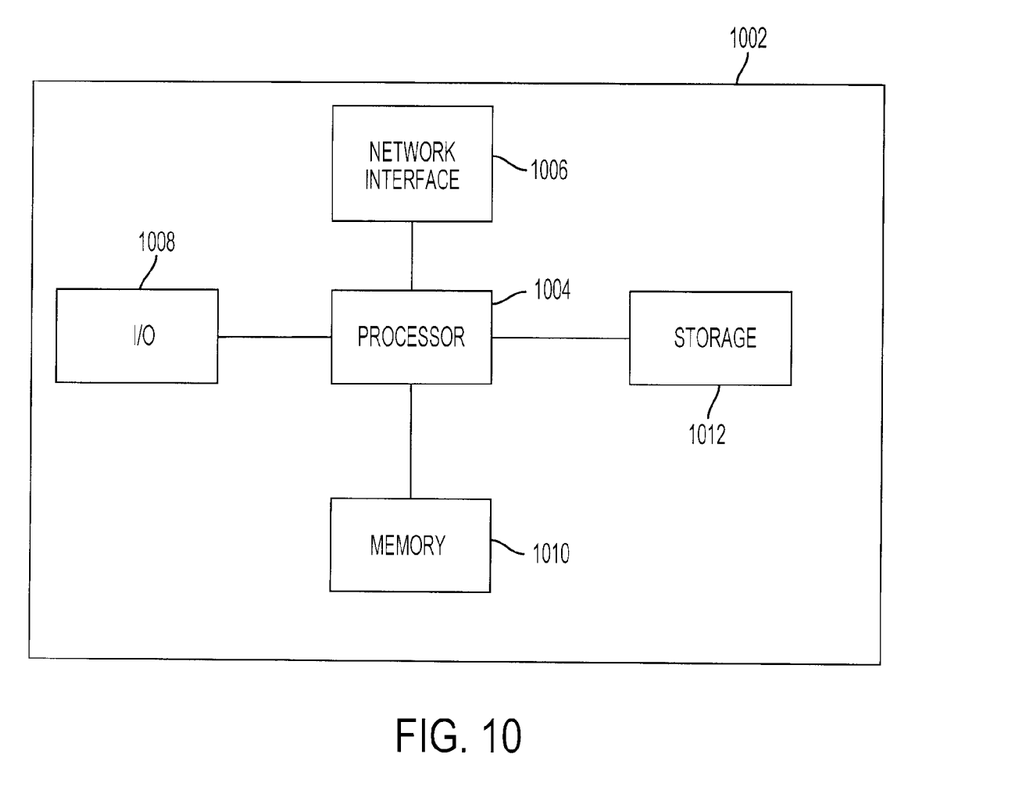
FIG. 10 is a high level block diagram of a computer capable of implementing the present invention.

The above-described method steps of FIGS. 2 and 3 for segmenting tubular or stroke-like structures in a 2D image may be implemented on a computer using well-known computer processors, memory units, storage devices, computer software, and other components. A high level block diagram of such a computer is illustrated in FIG. 10. Computer 1002 contains a processor 1004 which controls the overall operation of the computer 1002 by executing computer program instructions which define such operation. The computer program instructions may be stored in a storage device 1012 (e.g., magnetic disk) and loaded into memory 1010 when execution of the computer program instructions is desired. Thus, an application for segmenting stroke-like structures in 2D images may be defined by the computer program instructions stored in the memory 1010 and/or storage 1012 and controlled by the processor 1004 executing the computer program instructions. The computer 1002 also includes one or more network interfaces 1006 for communicating with other devices via a network. The computer 1002 also includes other input/output devices 1008 that enable user interaction with the computer 1002 (e.g., display, keyboard, mouse, speakers, buttons, etc.) One skilled in the art will recognize that an implementation of an actual computer could contain other components as well, and that FIG. 10 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for segmenting a tubular structure in a 2D image, comprising:
generating an ordered series of pearls along the tubular structure, wherein each pearl is a 2D disk having parameters of a center location and a radius that are determined based on parameters of a previously generated pearl and local pixel intensities inside of the pearl; and
generating a continuous model of the tubular structure using the center locations and the radii of the ordered series of pearls.

2. The method of claim 1, wherein said step of generating a continuous model of the tubular structure comprises at least one of:
generating a curve in three-dimensional space of x, coordinates, y-coordinates, and radii, using of a subdivision rule that interpolates the center locations and the radii of the ordered series of pearls;
fitting a piecewise polynomial model to the pearl centers and the radii of the ordered series of pearls; and
fitting a tangent curve to consecutive pearls in the ordered series of pearls, on opposite sides of each pearl.

3. The method of claim 1, further comprising:
receiving user inputs identifying a first region in said 2D image inside of the tubular structure and a second region in said 2D image outside of the tubular structure; and
estimating a classification function that classifies a pixel in said 2D image as inside or outside of the object being segmented, based on the first and second regions, respectively.

4. The method of claim 3, wherein said step of estimating a classification function comprises:
estimating first and second probability densities for the first and second regions, respectively, using non-parametric density estimation based on the pixel intensities in the first and second regions, wherein a pixel in said 2D image is determined to be inside or outside of the tubular structure based on the first and second probability densities.

5. The method of claim 1, wherein said step of generating an ordered series of pearls comprises, for each pearl:
(a) adjusting the center location of the pearl based on a function of the pixels that are in the pearl and classified as outside of the tubular structure;
(b) adjusting the radius of the pearl based on a function of the pixels in the pearl that are classified as inside of the tubular structure; and
(c) repeating steps (a) and (b) until the center location and the radius of the pearl converge.

6. The method of claim 5, wherein steps (a) and (b) are performed subject to constraints on a distance between the center of a current pearl and the center of a previous pearl, where the constraints are defined at least in terms of the respective radii of the current and previous pearls.

7. The method of claim 6, wherein the constraints comprise a minimal constraint $d_{min}(r_{i-1}, r_i)$ and maximal constraint $d_{max}(r_{i-1}, r_i)$ that are linear functions $d_{min,max}(r_{i-1}, r_i) = ar_{i-1} + br_i$, with bounds $d_{min}(r_{i-1}, r_i) = r_i/2$ and $d_{max}(r_{i-1}, r_i) = r_{i-1} + r_i$.

8. The method of claim 5, wherein said step of generating an ordered series of pearls further comprises, for each pearl:
(d) detecting connected components of pixels classified as in the tubular structure in a region surrounding the pearl;
(e) if the number of connected components detected is one, terminating said ordered series of pearls; and
(f) if the number of connected components detected is greater than one, determining at least one direction from the center of the pearl corresponding to at least one of the connected components; and
(g) initializing at least one next pearl in said at least one direction.

9. The method of claim 5, wherein step (f) comprises if the number of connected components is greater than two, determining that a bifurcation exists in said tubular structure and determining multiple directions corresponding to multiple branches of the bifurcation, and step (g) comprises initializing a next pearl in each branch of the bifurcation.

10. The method of claim 5, wherein said step of generating an ordered series of pearls further comprises, for each pearl:
(d) determining whether the pearl intersects with any previous pearls, excluding a number of pearls immediately preceding the pearl in the ordered series of pearls; and
(e) if the pearl intersects with a previous pearl, linking the pearl to the previous pearl, such that the ordered series of pearls forms a loop, and terminating growth of said ordered series of pearls.

11. The method of claim 1, wherein said step of generating an ordered series of pearls comprises:
receiving an initial seed point and direction; and
sequentially generating pearls starting at said initial seed point and moving in said direction along the tubular structure by iteratively estimating the center location and radius for each pearl to fit each pearl to the tubular structure, until a stop condition is met.

12. The method of claim 1, where said step of generating a continuous model of the tubular structure by interpolating the center locations and the radii of the ordered series of pearls comprises:
interpolating the center locations and the radii of the ordered series of pearls using iterative subdivision, which at each iteration introduces a new pearl between consecutive pearls in the ordered series of pearls.

13. The method of claim 1, wherein said tubular structure represents a vascular structure.

14. The method of claim 1, wherein said 2D image is a satellite image.

15. The method of claim 1, further comprising:
displaying the continuous model of the tubular structure; and
receiving a user input in response to displaying the continuous model of the tubular structure.

16. The method of claim 15, further comprising at least one of:
deleting a branch of the tubular structure modeled by the ordered series of pearls in response to receiving said user input; and
initiating an ordered series of pearl at a branch of the tubular structure not yet modeled by the ordered series of pearls in response to receiving said user input.

17. The method of claim 1, wherein said step of generating an ordered series of pearls along the tubular structure comprises:
receiving a user input tracing a path along the tubular structure; and
generating the pearls at samples along the path in real time as the user input is being received.

18. An apparatus for segmenting a tubular structure in a 2D image, comprising:
means for generating an ordered series of pearls along the tubular structure, wherein each pearl is a 2D disk having parameters of a center location and a radius that are determined based on parameters of a previously generated pearl and local pixel intensities inside of the pearl; and means for generating a continuous model of the tubular structure using the center locations and the radii of the ordered series of pearls.

19. The apparatus of claim 18, wherein said means for generating an ordered series of pearls comprises:

means for iteratively adjusting the center location of each pearl based on pixels that are in that pearl and outside of the tubular structure;

means for iteratively adjusting the radius of each pearl based on a function of the pixels in that pearl that are inside of the tubular structure; and means for determining whether the center location and radius of each pearl have converged.

20. The apparatus of claim 18, further comprising:

means for displaying the continuous model of the tubular structure; and means for receiving a user input in response to displaying the continuous model of the tubular structure.

21. A non-transitory computer readable medium encoded with computer executable instructions for segmenting a tubular structure in a 2D image, the computer executable instructions defining a step comprising:

generating an ordered series of pearls along the tubular structure, wherein each pearl is a 2D disk having parameters of a center location and a radius that are determined based on parameters of a previously generated pearl and local pixel intensities inside of the pearl; and generating a continuous model of the tubular structure using the center locations and the radii of the ordered series of pearls.

22. The non-transitory computer readable medium of claim 21, wherein the computer executable instructions defining the step of generating an ordered series of pearls comprise computer executable instructions defining the steps of, for each pearl:

(a) adjusting the center location of the pearl based on pixels that are in the pearl and outside of the tubular structure;

(b) adjusting the radius of the pearl based on a function of the pixels in the pearl that are inside of the tubular structure; and (c) repeating steps (a) and (b) until the center location and the radius of the pearl converge.

* * * * *